US010007171B1

(12) United States Patent
Bhardwaj

(10) Patent No.: US 10,007,171 B1
(45) Date of Patent: Jun. 26, 2018

(54) BATTERY WITH A STRUCTURAL GAP

(71) Applicant: Google LLC, Mountain View, CA (US)

(72) Inventor: Ramesh C. Bhardwaj, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 14/918,664

(22) Filed: Oct. 21, 2015

(51) Int. Cl.
| | |
|---|---|
| *G03B 7/26* | (2006.01) |
| *H01M 2/10* | (2006.01) |
| *H04N 5/232* | (2006.01) |
| *H04R 3/00* | (2006.01) |
| *H04N 1/00* | (2006.01) |
| *B60R 16/033* | (2006.01) |

(52) U.S. Cl.
CPC ............ *G03B 7/26* (2013.01); *H01M 2/1022* (2013.01); *H04N 1/00885* (2013.01); *H04N 5/23241* (2013.01); *H04R 3/00* (2013.01); *B60R 16/033* (2013.01); *H01M 2/1083* (2013.01); *H01M 2220/20* (2013.01); *H01M 2220/30* (2013.01)

(58) Field of Classification Search
CPC ........ G03B 17/02; G03B 7/26; H04N 5/2252; H04N 1/00885; H04N 1/00907
USPC .................................................. 396/539, 535
See application file for complete search history.

(56) References Cited

U.S. PATENT DOCUMENTS

| 4,262,064 A | 4/1981 | Nagle | |
|---|---|---|---|
| 5,492,782 A * | 2/1996 | Higley | ................... H01M 4/26 429/127 |
| 8,546,010 B2 | 10/2013 | Qiu | |
| 8,593,564 B2 * | 11/2013 | Border | ............... H04N 5/23229 348/340 |

(Continued)

FOREIGN PATENT DOCUMENTS

| GB | 2237960 A | | 5/1991 |
|---|---|---|---|
| JP | 58-12254 | * | 1/1983 |

(Continued)

OTHER PUBLICATIONS

Ascent Batteries International, Inc., Home Page, Retrieved from the Internet Oct. 20, 2015 <http://www.ascentbatteries.com/>, 4 pages.

(Continued)

*Primary Examiner* — Christopher Mahoney
(74) *Attorney, Agent, or Firm* — McDonnell Boehnen Hulbert & Berghoff LLP; Michael D. Clifford

(57) ABSTRACT

In a first example, an imaging system includes a battery comprising a structural gap. The battery is configured to provide electrical power to the imaging system. The imaging system further includes an image sensor configured to sense light that passes through the structural gap. In a second example, a vehicle door includes a frame and a battery comprising a structural gap. The battery is positioned within the frame and is configured to provide electrical power to the vehicle. The vehicle door also includes a handle assembly configured to open the door. The handle assembly is positioned within the structural gap of the battery. In a third (Continued)

example, a loudspeaker includes a battery comprising a structural gap and an audio driver positioned within the structural gap. The battery is configured to provide electrical power to the audio driver to generate sound waves.

20 Claims, 22 Drawing Sheets

(56) References Cited

U.S. PATENT DOCUMENTS

| | | | | |
|---|---|---|---|---|
| 8,736,690 | B2 * | 5/2014 | Imanishi | H04N 5/23258 348/208.2 |
| 8,786,675 | B2 | 7/2014 | Deering | |
| 9,091,502 | B1 * | 7/2015 | Morrison | F41A 21/30 |
| 2007/0247786 | A1 * | 10/2007 | Aamodt | A61N 1/378 361/517 |
| 2008/0204415 | A1 | 8/2008 | Jung | |
| 2014/0370347 | A1 * | 12/2014 | Jung | H01M 2/0275 429/94 |
| 2015/0049004 | A1 * | 2/2015 | Deering | G02B 27/0172 345/8 |

FOREIGN PATENT DOCUMENTS

| | | | | |
|---|---|---|---|---|
| JP | | 06059176 A | * 3/1994 | |
| WO | WO 2015194986 A1 | * 12/2015 | | G03B 7/26 |

OTHER PUBLICATIONS

Gizmag, "LG's hexagonal battery gives an extra charge to round smartwatches" Retrieved from the Internet Oct. 20, 2015 <http://www.gizmag.com/round-smartwatch-battery-life/38228/>, 8 pages.
Wiggers, Kyle, "LG's Hexagonal Battery Could Boost Your Future Smartwatch's Battery," Retrieved from the Internet Oct. 20, 2015 <http://www.digitaltrends.com/wearables/lgs-hexagonal-batteries-smartwatches/> Jun. 29, 2015, 5 pages.
Thorp-Lancaster, Dan, "LG unveils hexagonal batteries destined for circular smartwatches," Retrieved from the Internet Oct. 20, 2015 <http://www.androidcentral.com/lgs-new-hexagonal-batteries-expected-increase-smartwatch-life-4-hours> Jun. 29, 2015, 6 pages.
Lawler, Richard, "LG Chem has curved batteries in production, ready for 'phones, watches and glasses'" Retrieved from the Internet Oct. 20, 2015 <http://www.engadget.com/2013/10/07/lg-chem-curved-stepped-cable-batteries-coming/> Oct. 7, 2013, 5 pages.
Fingas, Jon, "LG's hexagonal battery promises longer-lasting smartwatches," Retrieved from the Internet Oct. 20, 2015 <http://www.engadget.com/2015/06/29/lg-hexagonal-smartwatch-battery/> Jun. 29, 2015, 5 pages.
"Weird Looking Honda Motorcycle Battery!" Recorded Web Video [online], smallengineshop, YouTube, Dec. 28, 2012. [Retrieved on Oct. 20, 2015] from Internet: <https://www.youtube.com/watch?v=Wzk56JBILPM>.

* cited by examiner

BATTERY WITH A STRUCTURAL GAP

BACKGROUND

An electronic device, such as a camera or a smartwatch, may include interior space that is curved or irregular in some way. However, batteries (or individual cells of batteries) used in such a device often have a square or rectangular shape. Using a square or rectangular-shaped battery in such a device may result in the inefficient use of the available interior space within the device. That is, the energy capacity of the battery may be small due to the battery's shape not conforming to the interior space of the device.

SUMMARY

Consumer demand for small and lightweight battery-powered devices may present a conflict between battery life (e.g., how long a battery can properly provide power to a device without a recharge) and device size. For a given type of battery, battery life generally increases as the size of the battery is increased. However, batteries are often composed of one or more rectangular or square-shaped cells, which might not conform to irregularly shaped interior spaces of some devices. This may result in a shorter battery life than might otherwise be achieved with more efficient utilization of space. One way to help alleviate this is with a battery that includes a hole or other type of structural gap that allows the battery to more efficiently fill the space available within the device. This may allow increased battery life without increasing the size of the device. For example, a camera may include a battery with a structural gap that accommodates various imaging components of the camera, such as an aperture, a lens, and/or an image sensor. In another example, a battery that powers a vehicle may be placed within an otherwise empty space within a door of the vehicle. Such a battery may include a structural gap that accommodates components of the door, such as a handle assembly. In yet another example, a battery that powers a loudspeaker may include a structural gap that accommodates an audio driver of the loudspeaker.

In one example, an imaging system includes a battery that includes a structural gap. The battery is configured to provide electrical power to the imaging system. The imaging system further includes an image sensor configured to sense light that passes through the structural gap.

In another example, a vehicle door includes a frame and a battery that includes a structural gap. The battery is positioned within the frame and is configured to provide electrical power to the vehicle. The vehicle door further includes a handle assembly configured to open the door. The handle assembly is positioned within the structural gap of the battery.

In yet another example, a loudspeaker includes a battery that includes a structural gap and an audio driver positioned within the structural gap. The battery is configured to provide electrical power to the audio driver to generate sound waves.

These as well as other aspects, advantages, and alternatives, will become apparent to those of ordinary skill in the art by reading the following detailed description, with reference where appropriate to the accompanying figures.

DETAILED DESCRIPTION

Figure 1:
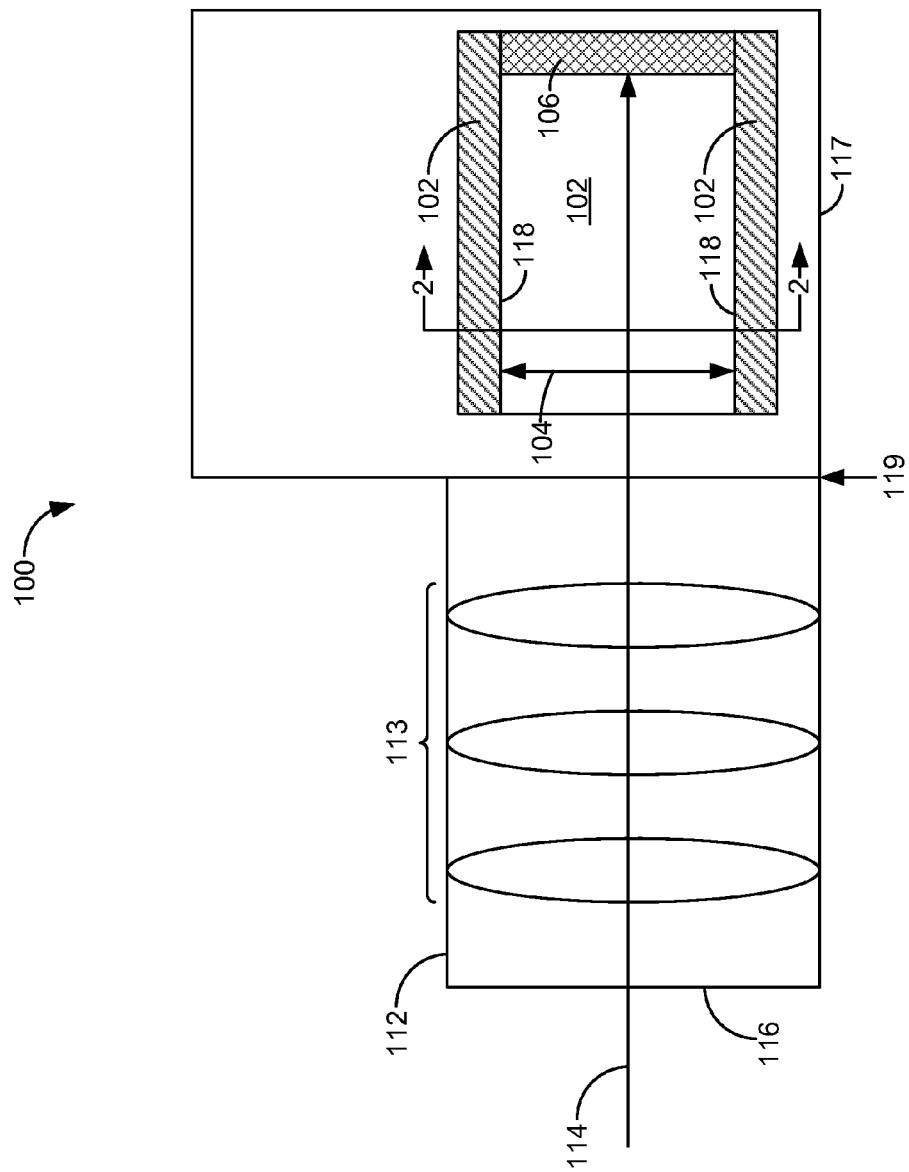
FIG. 1 is a cross section of an example imaging system that includes a battery with a structural gap.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

Consumer demand for battery-powered devices such as smart watches, cameras, head-mounted displays, loudspeakers, and vehicles, has increased significantly in recent years. Further, consumers often desire enhanced performance and reduced size in new generations of battery-powered devices, as compared to previous generations of such devices. However, enhancing the performance of such a device often involves new functionality and/or new components, which can in turn increase the power consumption of the device. To account for greater power consumption, a battery with a higher capacity may be incorporated into the device. However, a higher capacity battery is often larger than a lower capacity battery of the same type. Thus, adding a higher capacity battery often increases the size of a new device (if all other components remain the same size).

In addition, batteries are often composed of one or more rectangular or square-shaped cells, which might not conform to irregularly shaped interior spaces of some devices. This may result in a lower battery capacity for the device than might otherwise be achieved with more efficient utilization of space.

To address at least some of the above challenges, in an example embodiment a device may include a battery that is shaped to better fit the interior of the device and/or include a structural gap that accommodates other circuitry or components of the device. In one aspect, the structural features of the device and the battery are designed to conform to each other and/or accommodate functional components of the device. In one such embodiment, a camera may include a battery with a structural gap that accommodates various imaging components of the camera, such as an aperture, a lens, and/or an image sensor. The battery may be included as part of a structure that houses a lens and/or a sensor of the camera. More specifically, the camera may be constructed such that the image sensor of the camera is configured to detect light that passes through the structural gap of the battery, the lens, and/or the aperture. These configurations may reduce the thickness or overall size of the camera.

In another example, a battery that powers a vehicle may be placed within an otherwise empty space within a door of the vehicle. The battery may include a structural gap that accommodates a handle or other components of the door. In some examples, the battery within the door may be used to supplement power provided by a battery located under the hood of the car, for example. Placing a battery within the door of the car may serve several advantages. First, using the otherwise non-functional empty space within the door to house a battery may increase (i) the amount of peak current that the vehicle may use for acceleration and (ii) the distance the vehicle can be driven before recharging is required. Placing the additional weight of the battery inside the door (e.g., near a wheel of the vehicle) may also improve traction and stability.

In yet another example, a battery that powers a loudspeaker may include a structural gap that accommodates an audio driver of the loudspeaker. In ways similar to those mentioned above, a battery with such a structural gap can be shaped to fit an enclosure of the loudspeaker (i.e., take advantage of available space) and may help improve performance of the loudspeaker by maximizing the power capacity of the battery.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 is a cross section of an imaging system 100 (e.g., a camera) that includes a battery 102 with a structural gap 104. FIG. 1 also shows an image sensor 106, a lens apparatus 112, one or more lenses 113, light 114, an aperture 116, a main body 117, an inner boundary 118, and a front face 119. In one example, the imaging system 100 may be a mirrorless interchangeable lens camera (MILC). In another example, the imaging system 100 may be a mirrorless camera that is not configured for use with interchangeable lenses. (Other example embodiments described below include a digital single-lens reflex camera (DSLR).)

The battery 102 may be wired to electrical systems of the imaging system 100 or otherwise configured to provide electrical power to the imaging system 100. Herein, the inner boundary 118 of the battery 102 is shown as having a rectangular shape that surrounds the structural gap 104, but the battery 102 may have various other shapes as well. For example, the battery 102 may have shapes such as a toroidal shape, a torus shape, and a hexagonal shape, to name a few examples. The battery 102 may have any shape that forms a structural gap through which light may travel and be captured by the image sensor 106. In some instances, the battery 102 is a lithium-ion battery, but other examples such as a nickel metal hydride battery (NiMH) or a nickel cadmium battery (NiCd) are possible. The structural gap 104 may be defined by the shape of the inner boundary 118.

In some examples, the battery 102 may be an "auxiliary battery." That is, the imaging system 100 may include a second battery (not shown) that has a larger energy capacity than the battery 102. Under normal operating conditions, the second battery may provide primary power to the imaging system 100 and the battery 102 might only provide power to the imaging system 100 in instances where the second battery is running low on charge or in instances where the imaging system 100 is consuming an abnormally large amount of power.

Figure 2:
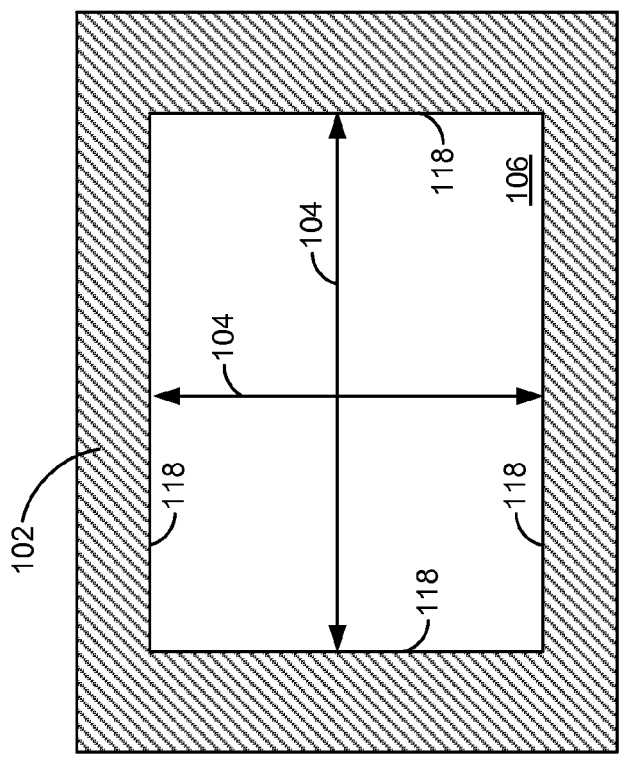
FIG. 2 is another cross section of an example imaging system that includes a battery with a structural gap.

As shown in FIG. 2, the structural gap 104 of the battery 102 may be rectangularly shaped and defined by the inner boundary 118. The battery 102 and/or the inner boundary 118 may be sized so that the image sensor 106 fits snugly within the inner boundary 118 (i.e., within the structural gap 104). In other examples, the image sensor 106 may be positioned behind the battery 102 and not within the structural gap 104. In such examples, the battery 102 might or might not be in contact with the battery 102.

The image sensor 106 may include any circuit or device configured to (i) sense intensities and colors of light incident upon respective portions (e.g., pixels) of the image sensor 106 and (ii) generate signals representative of the intensities and colors sensed at the respective portions. For example, the image sensor 106 may include a charge-coupled device (CCD), an active pixel sensor, or a CMOS image sensor. Other examples are possible. As shown in FIG. 1, the image sensor 106 may be configured and positioned to sense the light 114 that passes through aperture 116 of the lens apparatus 112. The aperture 116 may be circular, but other examples are possible.

The lens apparatus 112 may include the one or more lenses 113. The lens apparatus 112 may include a can-like or cylindrical structure configured to adjust the focal length(s) of the one or more lenses 113. The lens apparatus 112 may be detachable from the imaging system 100 so that other similar lens apparatus may be used with the imaging system 100.

The one or more lenses 113 may include any optical media, optical materials, or optical components configured to refract light to form an image on the image sensor 106. For example, the light 114 may pass through the aperture 116 and the one or more lenses 113 to be sensed by the image sensor 106.

In some examples, the imaging system 100 might not include an (external) lens apparatus 112. In such an example, the aperture 116 might be located at (or near) the front face 119 of the main body 117 of the imaging system 100. Regardless of whether the aperture 116 is located at a front end of the lens apparatus (as shown in FIG. 1) or at or near the front face 119, the light 114 may pass through the aperture 116 to be sensed by the image sensor 106.

Figure 3:
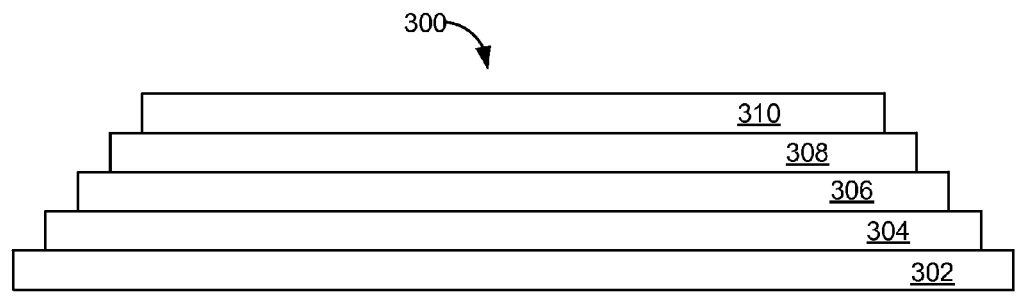
FIG. 3 shows layers of an example battery.

FIG. 3 shows layers of an example battery 300. The layers of the battery 300 may include a cathode current collector 302, a cathode 304, an electrolyte separator 306, an anode 308, and an anode current collector 310. The layers 302-310 may be flexible and take the form of a pre-manufactured substrate, sheet, or foil. In other examples, the layers 302-310 may include films deposited upon an additional substrate layer (not shown). In some instances, the battery 300 may include multiple cathode current collector layers, multiple cathode layers, multiple electrolyte separator layers, multiple anode layers, and/or multiple anode current collector layers, wired in series or parallel. Such arrangements may increase an output voltage and/or an output current of the battery 300.

The layers 302-310 may be stacked in the order shown in FIG. 3, so that when the battery is connected to an external circuit (not shown), free electrons generated at the anode 308 travel from the anode current collector 310, through the external circuit, and to the cathode current collector 302 and the cathode 304. The electrolyte separator 306 allows for the transfer of (e.g., lithium) ions from the anode 308 to the cathode 304 through the electrolyte separator 306, which enables the generation of free electrons at the anode 308.

The cathode current collector 302 and the anode current collector 310 may each include conductive materials, such as nickel or stainless steel. Other metals or other conductive materials are also possible. The cathode current collector 302 may be configured to collect electrons from the external circuit whereas the anode current collector 310 may be configured to collect electrons from the anode 308 and provide them to the external circuit.

The cathode 304 may include $LiCoO_2$, but other materials are possible as well.

The electrolyte separator 306 may include LiPON, but other materials are possible as well.

The anode 308 may include lithium or materials that include lithium, but other materials are possible as well.

Figure 4:
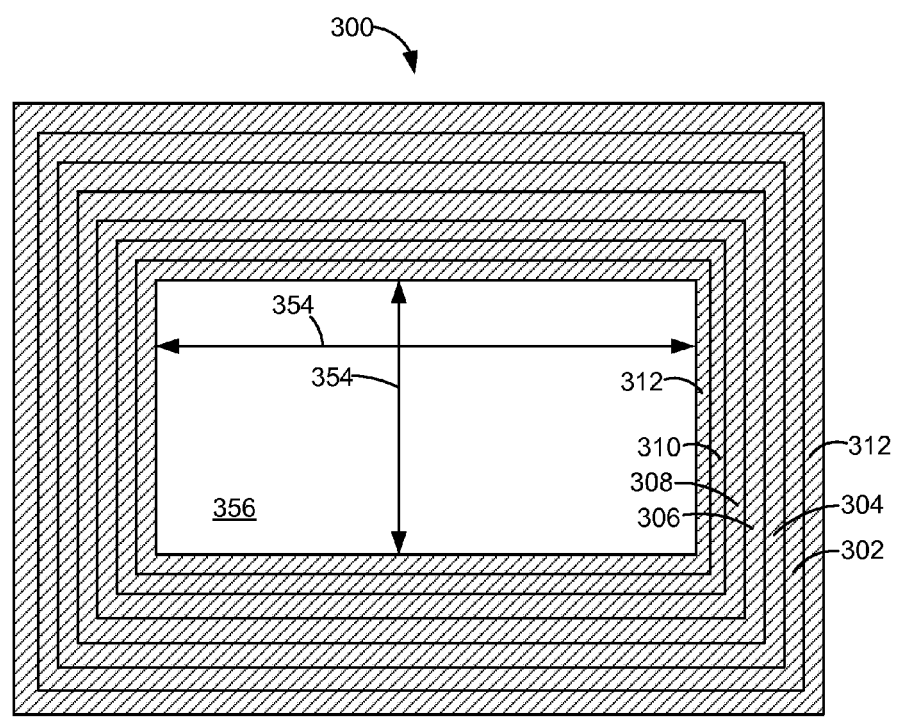
FIG. 4 shows layers of an example battery rolled into a shape having a structural gap.

FIG. 4 shows a cross section of the layers 302-310 of the battery 300 rolled into a rectangular shape having a structural gap 354. After being rolled into the rectangular shape, the battery 300 may be encapsulated in a protective coating 312. In some embodiments, the protective coating 312 may include silicon dioxide ($SiO_2$), alumina, or a ceramic. Other protective coating materials are possible as well. The battery 300 is one example of how the battery 102 of FIG. 1 may be formed to have the structural gap 104 that surrounds the image sensor 106. For example, an image sensor 356 is shown within the structural gap 354 of the battery 300.

Figure 5:
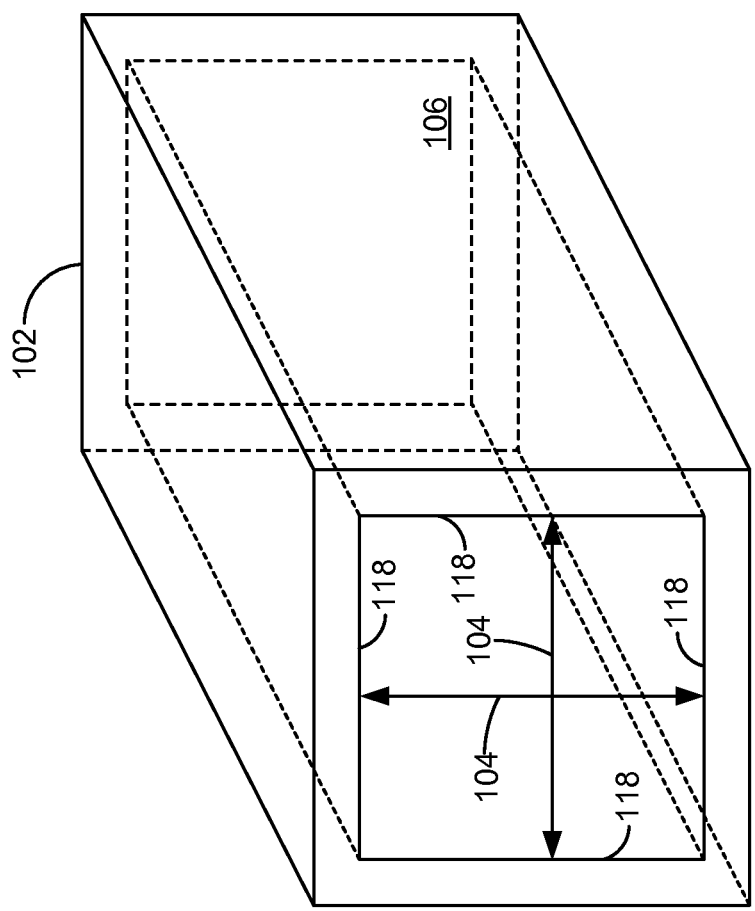
FIG. 5 is a perspective view of an example battery having a structural gap.

FIG. 5 is a perspective view of the battery 102. As shown, the battery 102 takes the shape of a rectangular prism with a hollow interior region defined by the structural gap 104 and/or the inner boundary 118. As described above, the battery 102 may take other shapes as well, such as a toroid, a torus, or a hexagonal shape.

Figure 6:
FIG. 6 shows layers of an example battery.

FIG. 6 shows layers of an example battery 600. The layers of the battery 600 may include a cathode current collector 602, a cathode 604, an electrolyte separator 606, an anode 608, and an anode current collector 610. The cathode current collector 602, the cathode 604, the electrolyte separator 606, the anode 608, and the anode current collector 610 may be similar, respectively, to the cathode current collector 302, the cathode 304, the electrolyte separator 306, the anode 308, and the anode current collector 310 as described above in relation to FIG. 3 and the battery 300.

Figure 7:
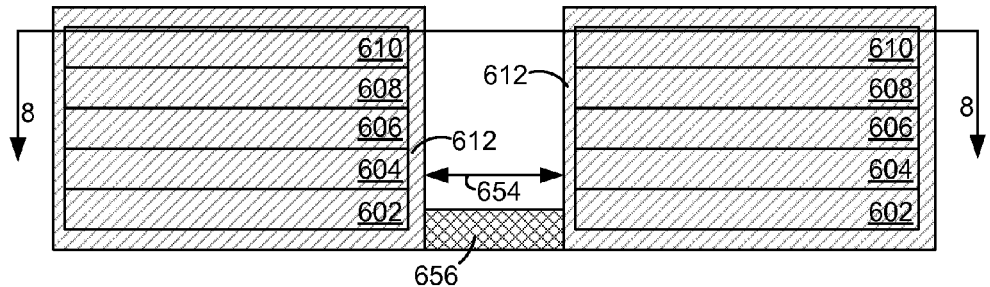
FIG. 7 is a cross section of a structural gap formed within an example battery.

FIG. 7 is a cross sectional view of the battery 600 with a structural gap 654. A hole has been cut within the layers 602-610 of the battery 600 to form the structural gap 654. After the hole is cut, the battery 600 may be encapsulated in a protective coating 612, which may be similar to the protective coating 312 described above. An image sensor 656 is shown within the structural gap 654.

Figure 8:
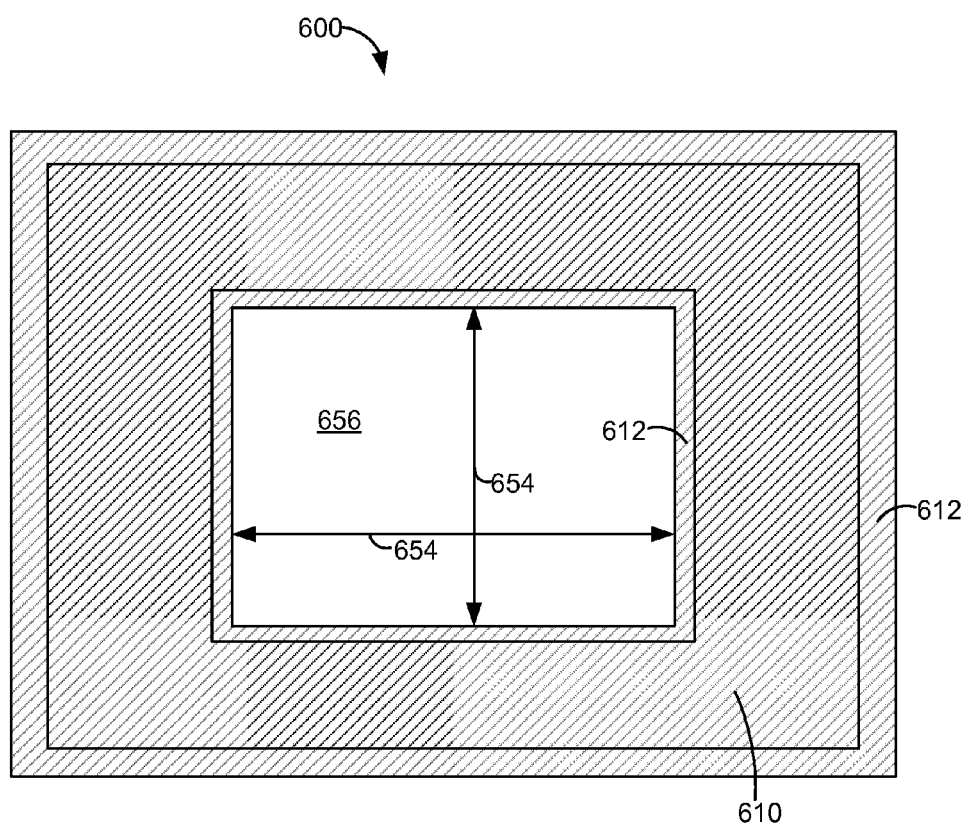
FIG. 8 is a cross section of a structural gap formed within an example battery.

FIG. 8 is a cross section of the structural gap 654 formed within the battery 600. As shown, the image sensor 656 is positioned within the structural gap 654. While the batteries 300 and 600 depict two examples of how the structural gap 104 may be formed within the battery 102, structural gaps may be formed within batteries in other ways as well.

Figure 9:
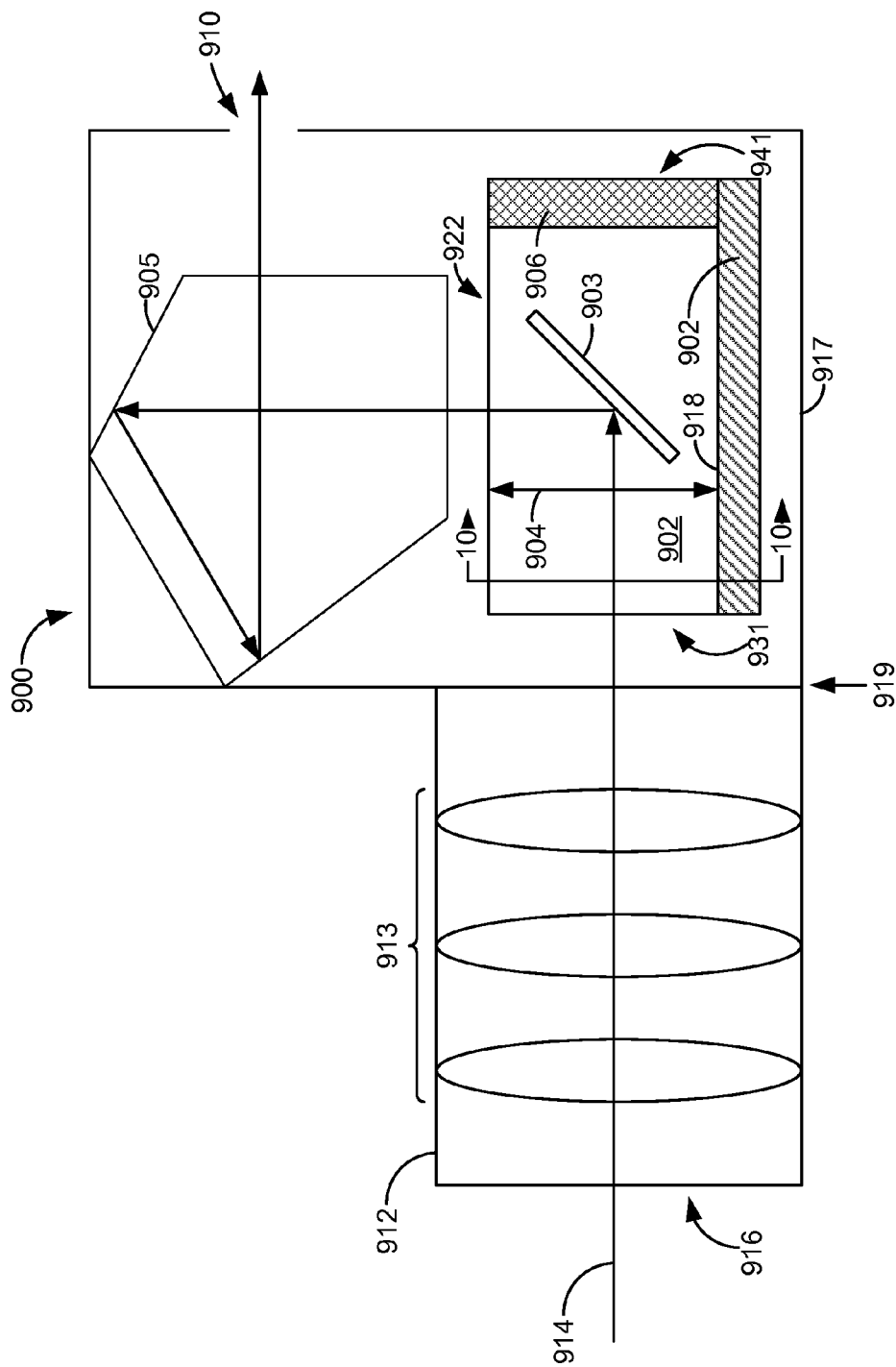
FIG. 9 is a cross section of an example imaging system that includes a battery with a structural gap and a reflex mirror in a first position.

FIG. 9 is a cross section of an imaging system 900 that includes a reflex mirror 903 set in a first position. The imaging system 900 could be a digital single-lens reflex camera (DSLR), but other examples are possible. The imaging system 900 also includes a battery 902 with a first structural gap 904 and a second structural gap 922, a viewfinder apparatus 905, an image sensor 906, an eyepiece 910, a lens apparatus 912 including one or more lenses 913, an aperture 916, a main body 917, an inner boundary 918, and a front face 919.

The battery 902, the image sensor 906, the lens apparatus 912, the one or more lenses 913, the aperture 916, the main body 917, and the front face 919 may have any of the respective characteristics of the battery 102, the image sensor 106, the lens apparatus 112, the one or more lenses 113, the aperture 116, the main body 117, and the front face 119 described above with regard to the imaging system 100.

Although possibly similar in some ways to the batteries 102, 300, and 600, the battery 902 may be shaped differently as shown in FIGS. 9, 10, 11, 12A, and 12B. The battery 902 may include a first structural gap 904 that is substantially perpendicular to a second structural gap 922 of the battery 902. The second structural gap 922 faces the viewfinder apparatus 905 and is shown in more detail in FIGS. 10, 12A, and 12B.

Figure 11:
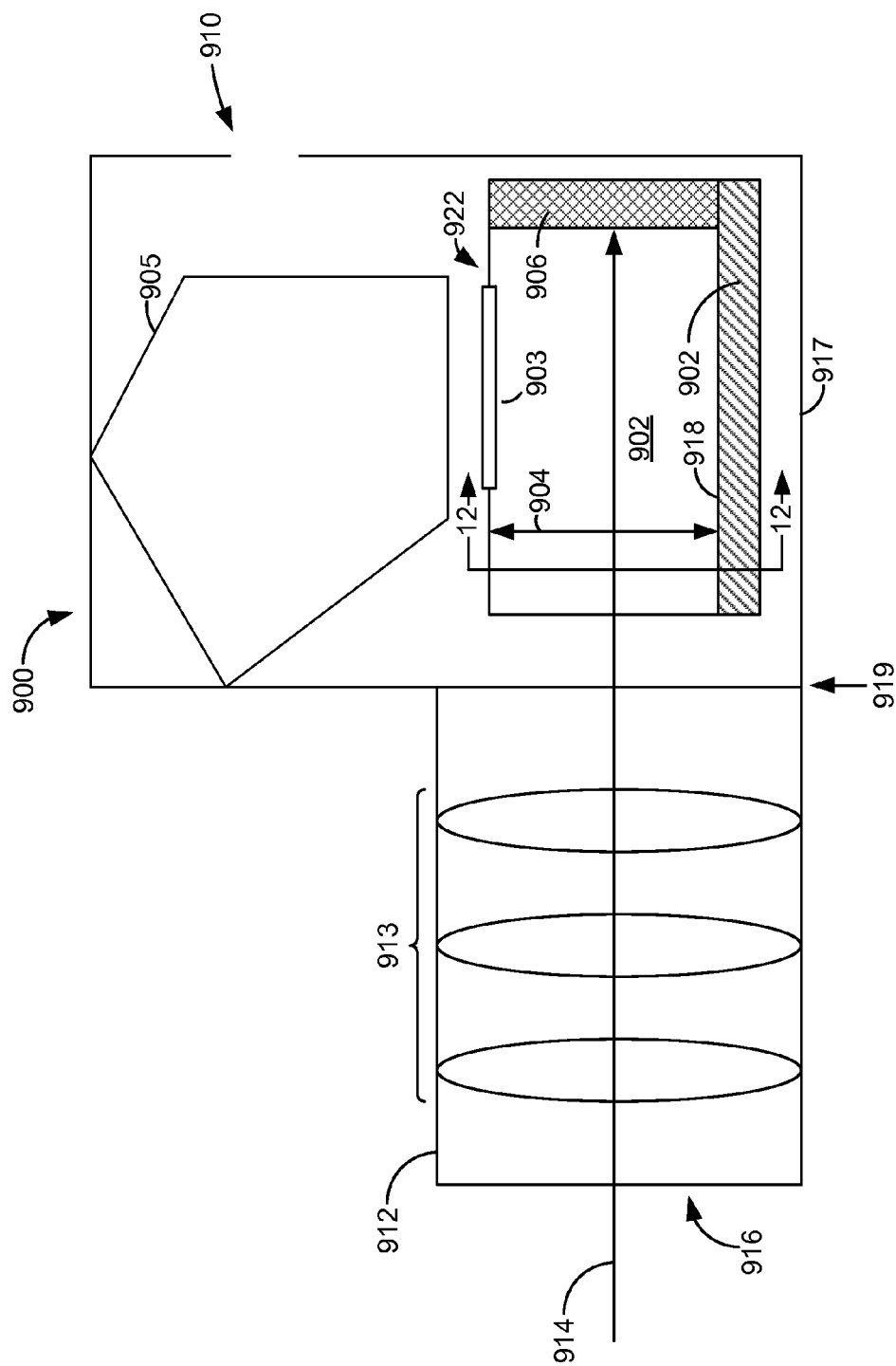
FIG. 11 is a cross section of an example imaging system that includes a battery with a structural gap and a reflex mirror in a second position.
Figure 12A:
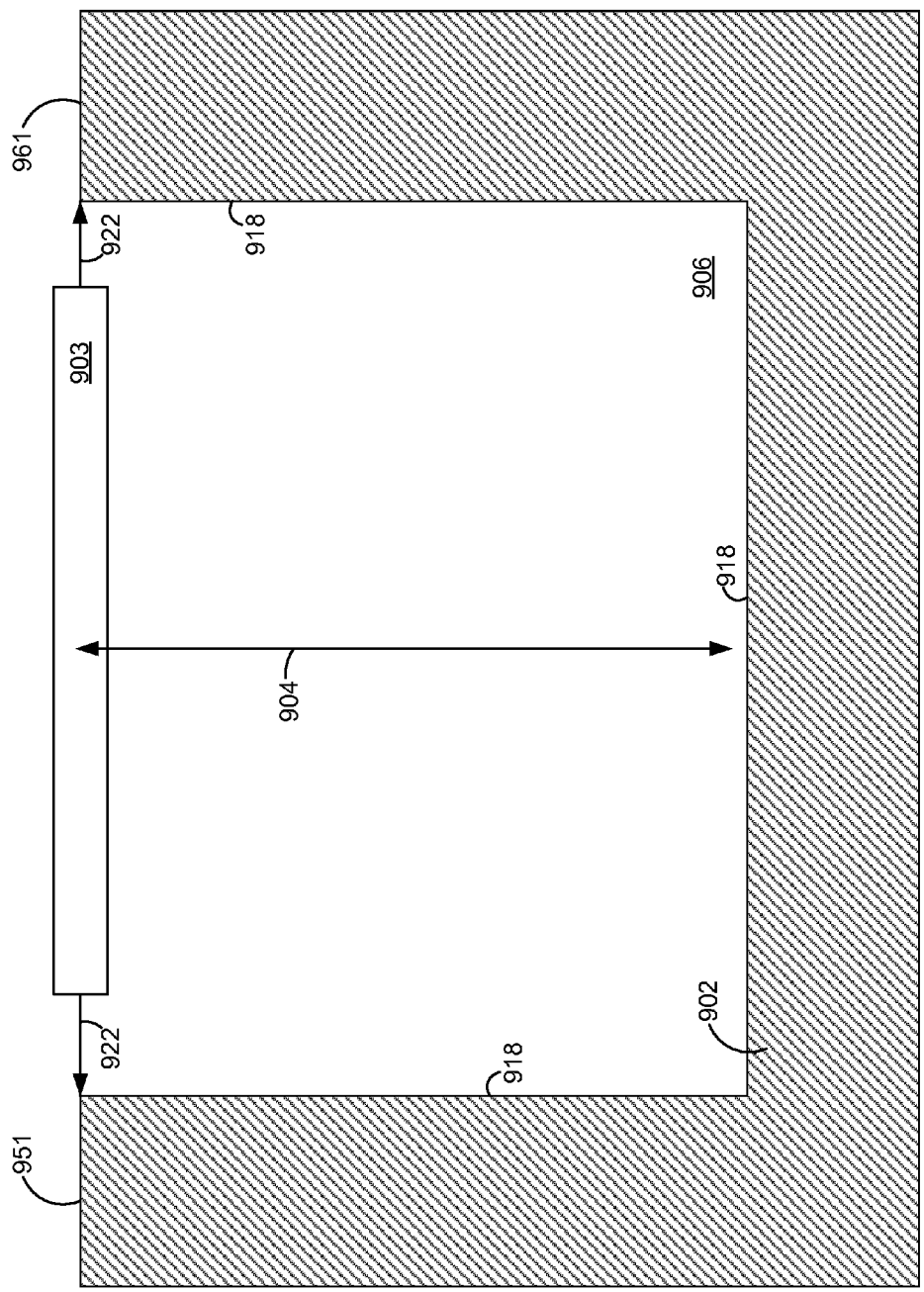
FIG. 12A is another cross section of an example imaging system that includes a battery with a structural gap and a reflex mirror in a second position.

The reflex mirror 903 may include a reflector or any structure configured to cause specular reflection of light that is incident upon the reflex mirror 903. The reflex mirror 903 is configured to be set in either a first position or a second position. In FIG. 9, the reflex mirror 903 is shown in the first position. In the first position, the reflex mirror 903 is configured to redirect the light 914 toward the viewfinder apparatus 905 after the light 914 passes through the one or more lenses 913. (FIGS. 11 and 12A show the reflex mirror 903 in the second position.)

Figure 10:
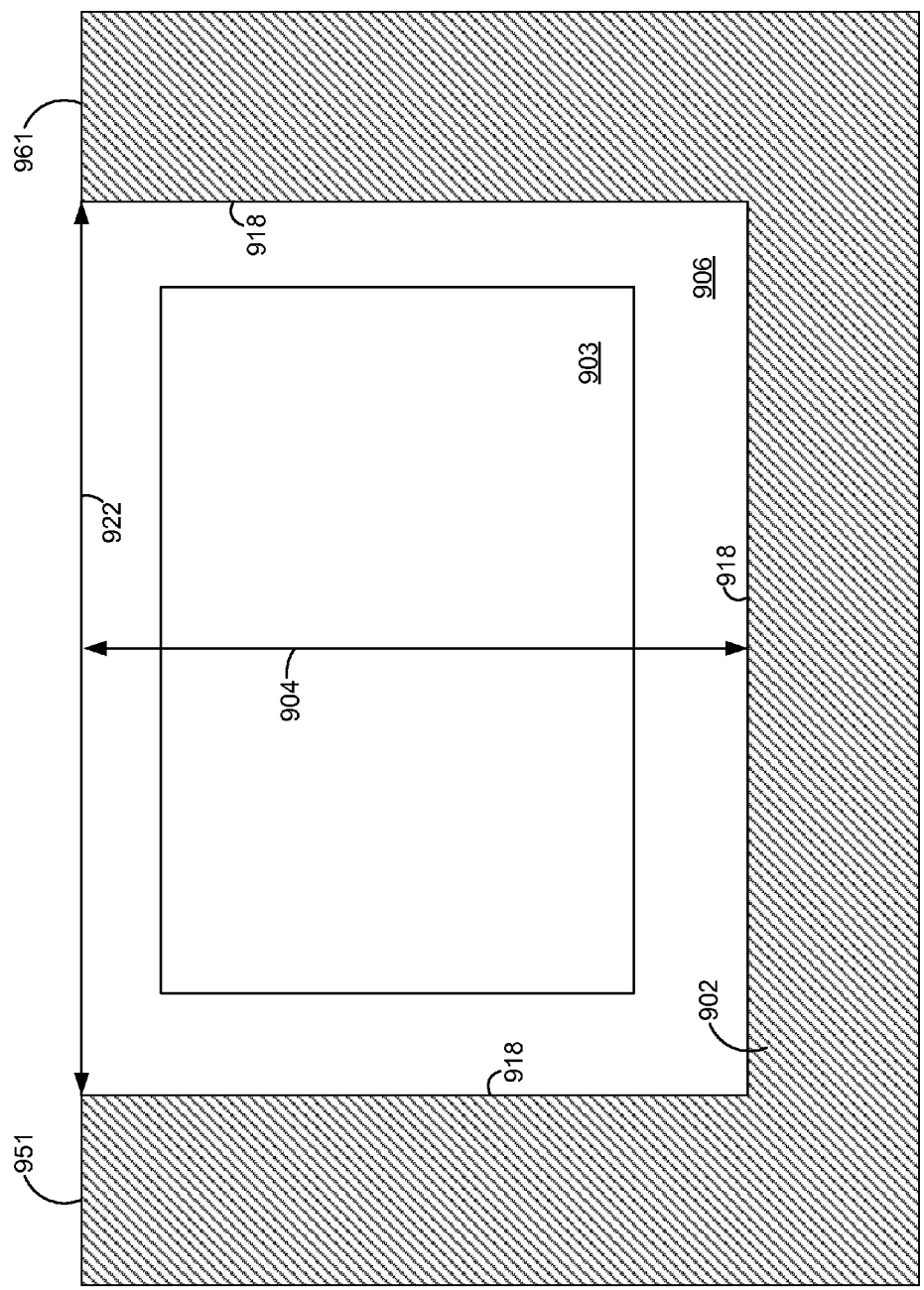
FIG. 10 is another cross section of an example imaging system that includes a battery with a structural gap and a reflex mirror in a first position.

The viewfinder apparatus 905 may include a prism having multiple interior surfaces configured to redirect the light 914 toward the eyepiece 910 so that a user may preview the scene that the imaging system 900 is positioned to capture. As shown in FIGS. 9 and 10, when the reflex mirror is in the first position, the redirected light 914 passes through the second structural gap 922 to the viewfinder apparatus 905 (shown in more detail in FIG. 10).

FIG. 10 is another cross section of the imaging system 900 showing the reflex mirror 903 in the first position. The battery 902 may have an inner boundary 918 that has a trough structure or a u-shape structure. The first structural gap 904 may be defined by a substantially u-shaped face at a front end 931 of the trough structure and a substantially u-shaped face at a back end 941 of the trough structure. That is, the battery 902 may surround the image sensor 906 on three sides (e.g., left, right, and bottom) but perhaps not on a fourth side (e.g., top).

The battery 902 may include the second structural gap 922 that faces the viewfinder apparatus 905. The second structural gap 922 may be defined by a first wall 951 and a second wall 961 of the trough structure of the battery 902. (See FIG. 12B for an additional view of the first wall 951 and the second wall 961.) The first wall 951 and the second wall 961 may be oriented substantially perpendicular to the image sensor 906. The second structural gap 922 may be configured to allow the reflex mirror 903 to pass through the second structural gap 922 to be set in the second position (as shown in FIGS. 11 and 12A). As shown in FIG. 10, the first structural gap 904 may be substantially perpendicular to the second structural gap 922. When the reflex mirror 903 is set in the first position, the light 914 redirected by the reflex mirror 903 may pass through the second structural gap 922.

FIG. 11 is cross section of the imaging system 900 that shows the reflex mirror 903 in the second position. When in the second position, the reflex mirror 903 is configured to allow the light 914 passing through the first structural gap 904 to pass to the image sensor 906. As shown, the reflex mirror 903 may be moved into or through the second structural gap 922 so that the light 914 may reach the image sensor 906.

FIG. 12A is another cross section of the imaging system 900 in which the reflex mirror 903 is in a second position that allows the light 914 to reach the image sensor 906.

Figure 12B:
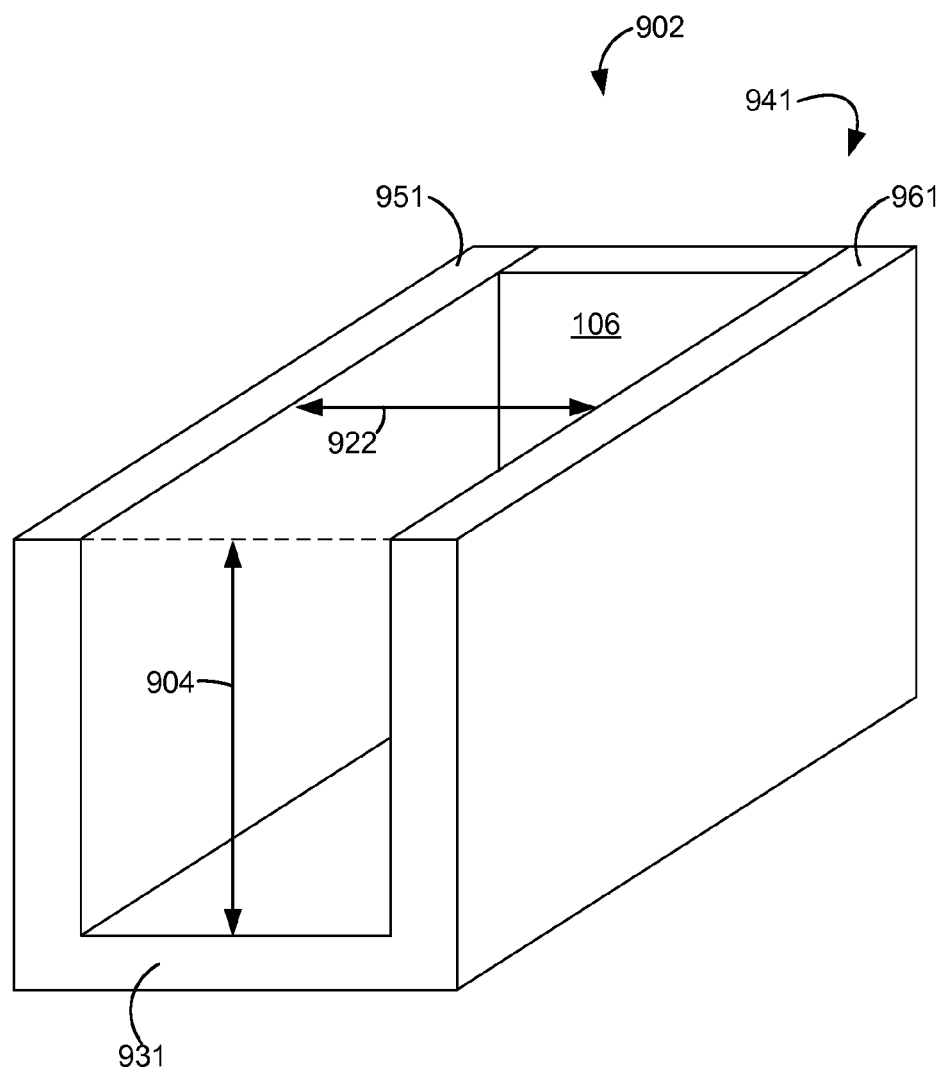
FIG. 12B is a perspective view of an example battery having a structural gap.

FIG. 12B is a perspective view of the battery 902. As shown, the first wall 951 and the second wall 961 are oriented substantially perpendicular to the image sensor 106.

Figure 13:
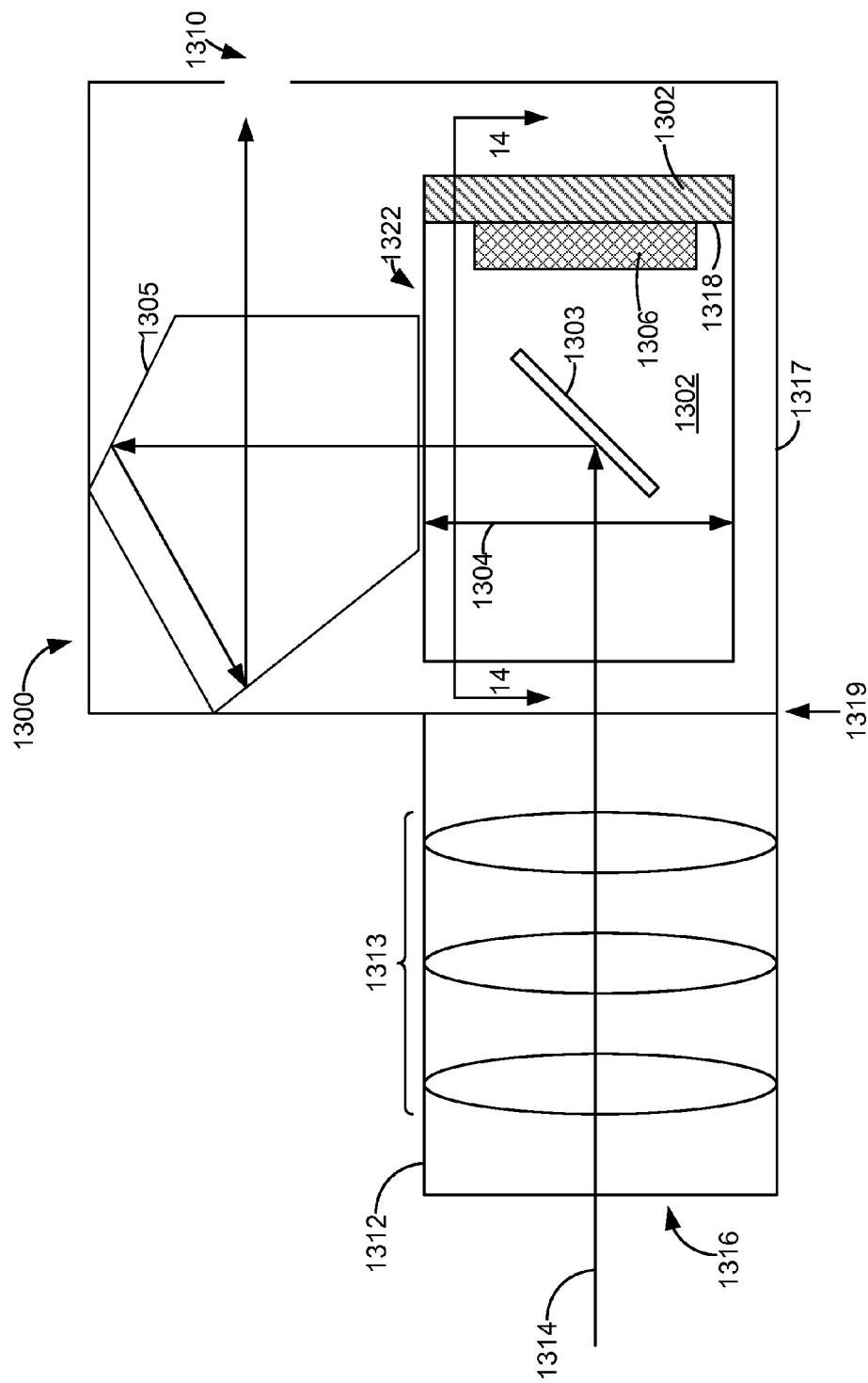
FIG. 13 is a cross section of an example imaging system that includes a battery with a structural gap and a reflex mirror in a first position.

FIG. 13 is a cross section of an imaging system 1300 that includes a reflex mirror 1303 set in a first position. The imaging system 1300 could be a digital single-lens reflex camera (DSLR), but other examples are possible. The imaging system 1300 also includes a battery 1302 with a first structural gap 1304 and a second structural gap 1322, a viewfinder apparatus 1305, an image sensor 1306, an eyepiece 1310, a lens apparatus 1312 including one or more lenses 1313, an aperture 1316, a main body 1317, an inner boundary 1318, and a front face 1319.

The battery 1302, the image sensor 1306, the lens apparatus 1312, the one or more lenses 1313, the aperture 1316, the main body 1317, and the front face 1319 may have any of the respective characteristics of the battery 902, the image sensor 906, the lens apparatus 912, the one or more lenses 913, the aperture 916, the main body 917, and the front face 919 described above with regard to the imaging system 900.

Although similar in some ways to the battery 102, the battery 1302 may be shaped differently as shown in FIGS. 13, 14, 15, 16A, and 16B. The battery 1302 may include a first structural gap 1304 that is substantially perpendicular to a second structural gap 1322 of the battery 1302. The second structural gap 1322 faces the viewfinder apparatus 1305 and is shown in more detail in FIGS. 14, 16A, and 16B.

Figure 15:
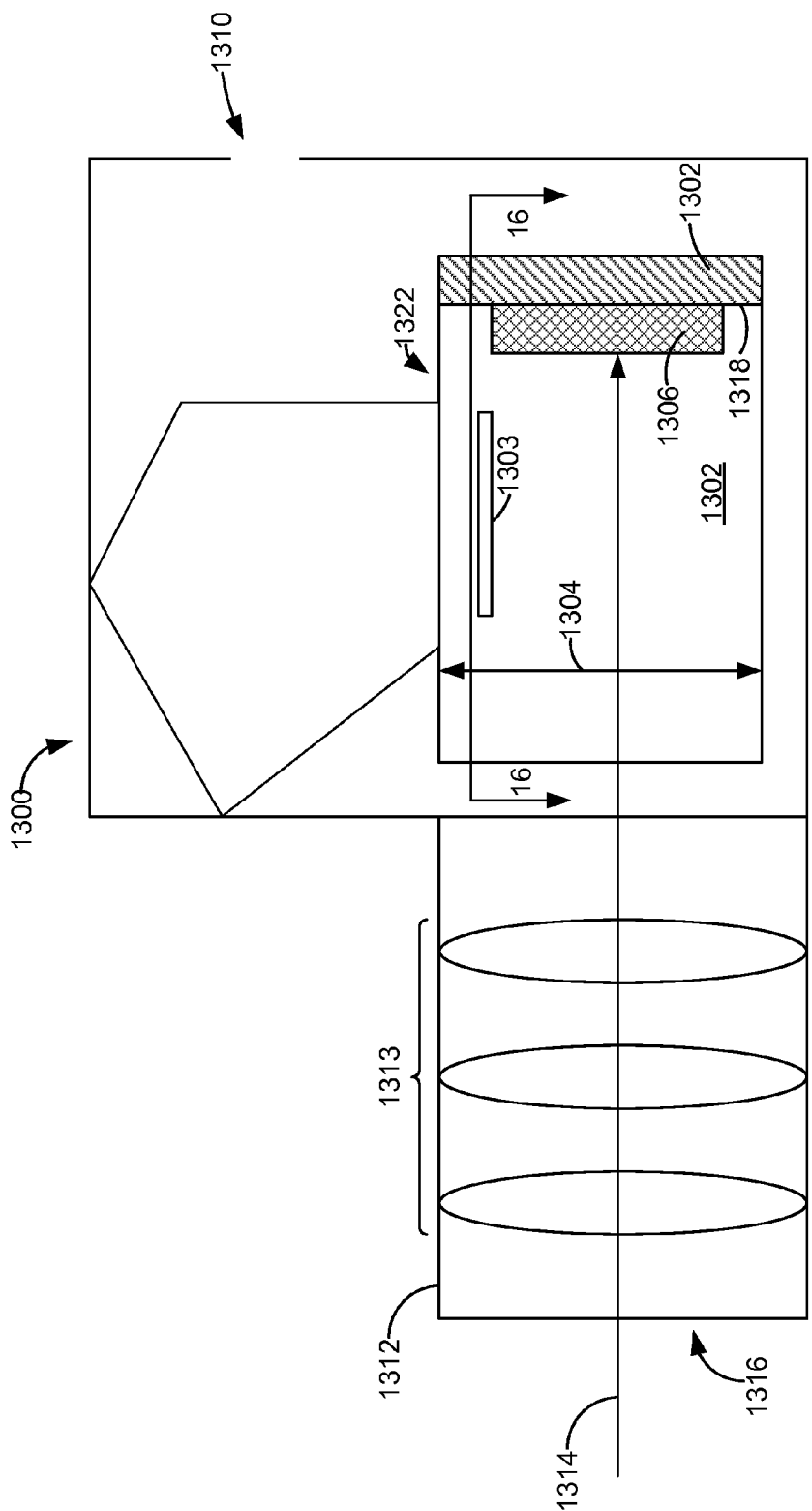
FIG. 15 is a cross section of an example imaging system that includes a battery with a structural gap and a reflex mirror in a second position.
Figure 16A:
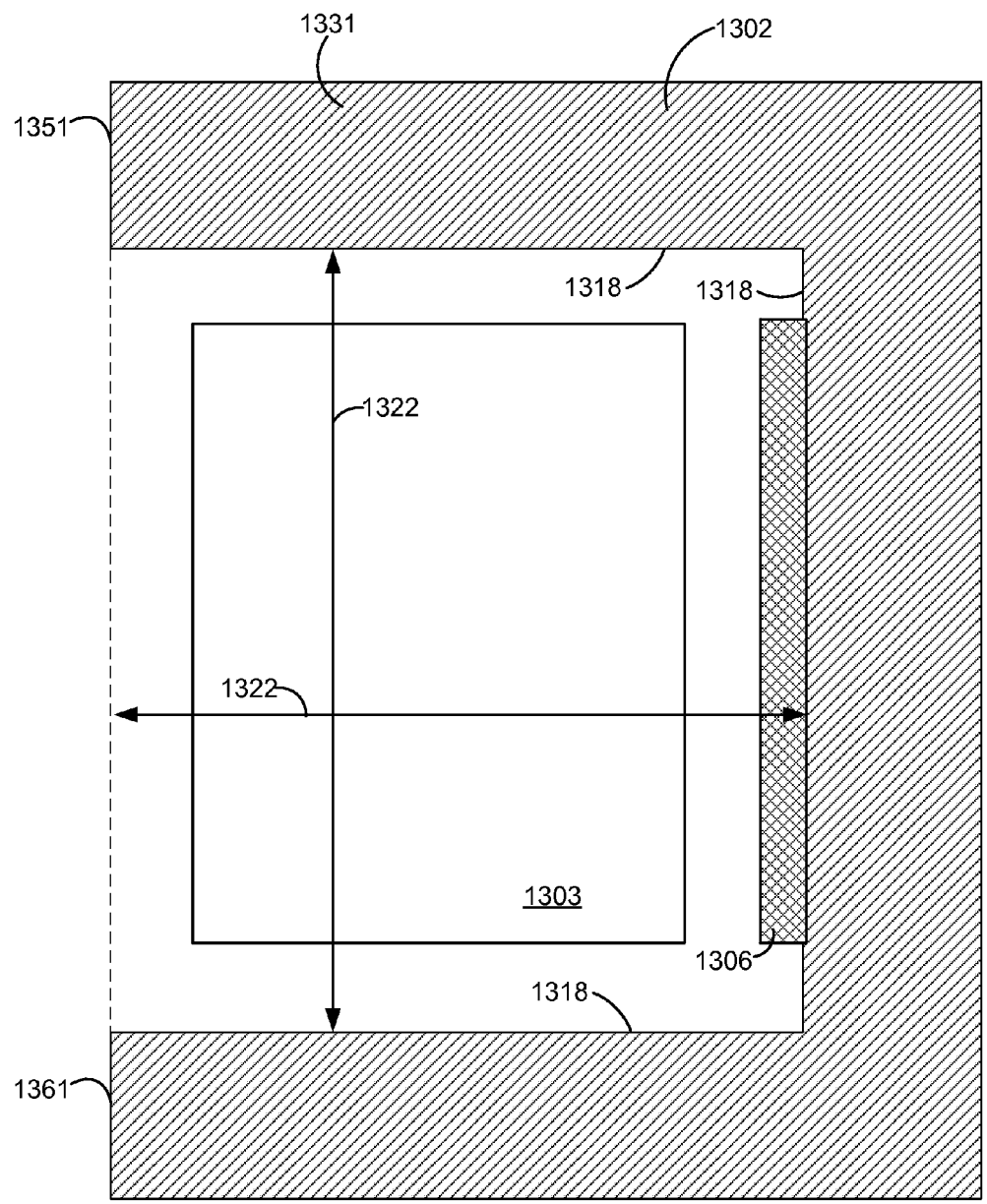
FIG. 16A is another cross section of an example imaging system that includes a battery with a structural gap and a reflex mirror in a second position.

The reflex mirror 1303 may include a reflector or any structure configured to cause specular reflection of light that is incident upon the reflex mirror 1303. The reflex mirror 1303 is configured to be set in either a first position or a second position. In FIG. 13, the reflex mirror 1303 is shown in the first position. In the first position, the reflex mirror 1303 is configured to redirect the light 1314 toward the viewfinder apparatus 1305 after the light 1314 passes through the one or more lenses 1313. (FIGS. 15 and 16A show the reflex mirror 1303 in the second position.)

Figure 14:
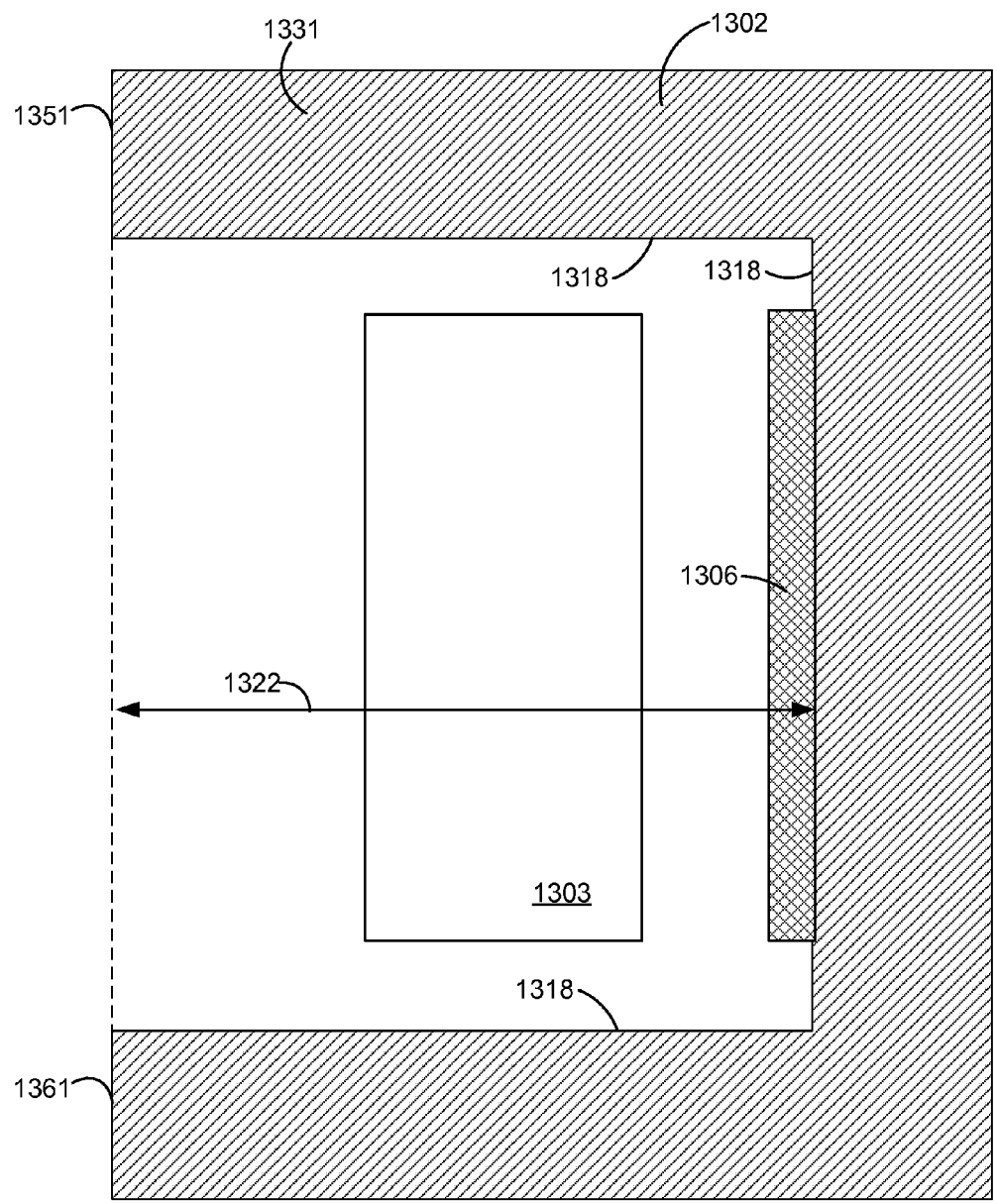
FIG. 14 is another cross section of an example imaging system that includes a battery with a structural gap and a reflex mirror in a first position.

The viewfinder apparatus 1305 may include a prism having multiple interior surfaces configured to redirect the light 1314 toward the eyepiece 1310 so that a user may preview the scene that the imaging system 1300 is positioned to capture. As shown in FIGS. 13 and 14, when the reflex mirror 1303 is in the first position, the redirected light 1314 passes through the second structural gap 1322 to the viewfinder apparatus 1305. (shown in more detail in FIG. 14).

FIG. 14 is another cross section of the imaging system 1300 showing the reflex mirror 1303 in the first position. The battery 1302 may have an inner boundary 1318 that has a trough structure or a u-shape structure. The second structural gap 1322 may be defined by a substantially u-shaped face at a top end 1331 of the trough structure and a substantially u-shaped face at a bottom end 1341 of the trough structure. (See FIG. 16B for views of the top end 1331 and the bottom end 1341.) That is, the battery 1302 may surround the image sensor 1306 on three sides (e.g., left, right, and back) but perhaps not on a fourth side (e.g., front).

Figure 16B:
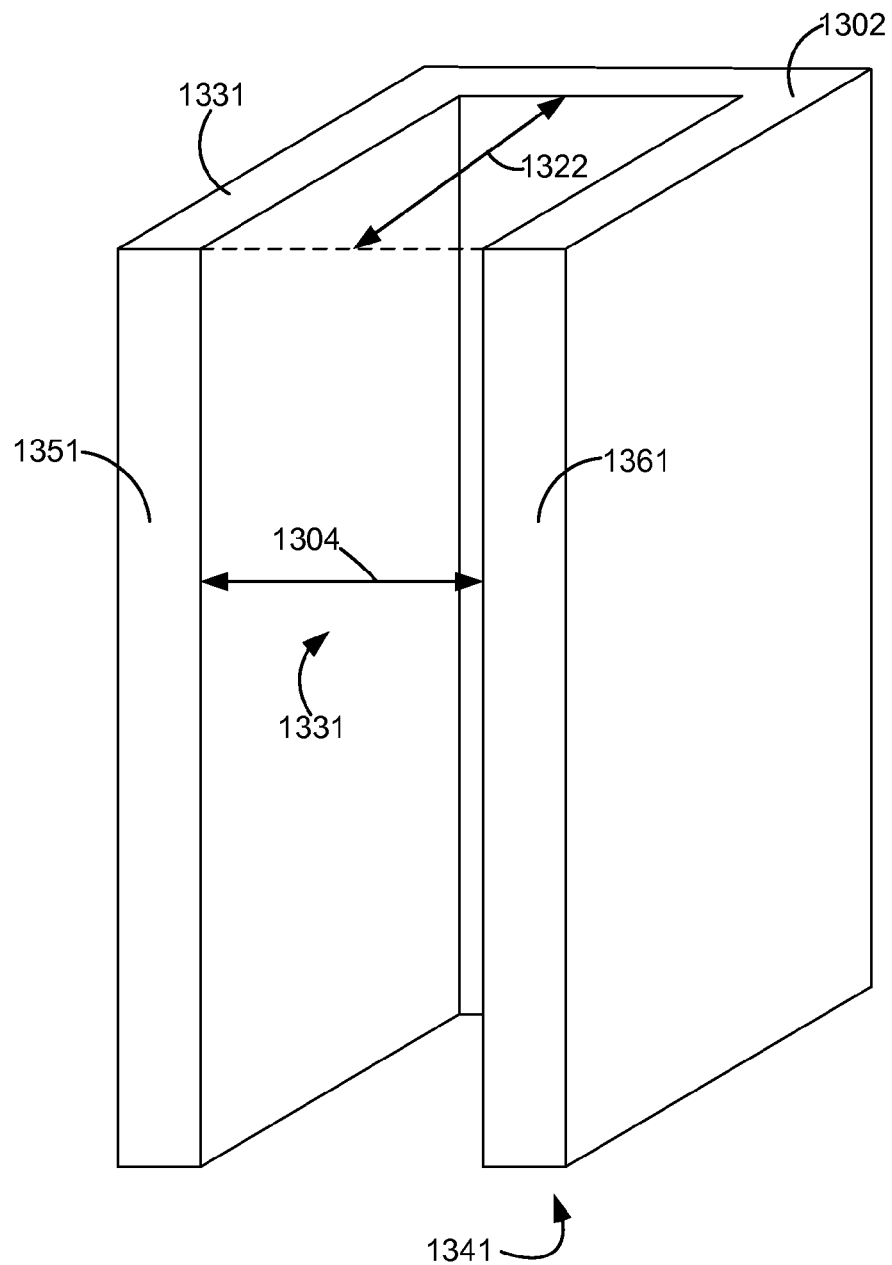
FIG. 16B is a perspective view of an example battery having a structural gap.

The battery 1302 may include the second structural gap 1322 that faces the viewfinder apparatus 1305. The second structural gap 1322 may be defined by a first wall 1351 and a second wall 1361 of the trough structure of the battery 1302. (See FIG. 16B for an additional view of the first wall 1351 and the second wall 1361.) The first wall 1351 and the second wall 1361 may be oriented substantially parallel to the image sensor 1306. The second structural gap 1322 may be configured to allow the reflex mirror 1303 to pass through the second structural gap 1322 to be set in the second position (as shown in FIGS. 15 and 16A). As shown in FIG. 16B, the second structural gap 1322 may be substantially perpendicular to the first structural gap 1304. When the reflex mirror 1303 is set in the first position, the light 1314 redirected by the reflex mirror 1303 may pass through the second structural gap 1322 (as shown in FIG. 13).

FIG. 15 is cross section of the imaging system 1300 that shows the reflex mirror 1303 in the second position. When in the second position, the reflex mirror 1303 is configured to allow the light 1314 passing through the first structural gap 1304 to pass to the image sensor 1306. As shown, the reflex mirror 1303 may be moved into or through the second structural gap 1322 so that the light 1314 may reach the image sensor 1306.

FIG. 16A is another cross section of the imaging system 1300 in which the reflex mirror 1303 is in a second position that allows the light 1314 to reach the image sensor 1306.

FIG. 16B is a perspective view of the battery 1302. The first wall 1351 and the second wall 1361 are oriented substantially parallel to the image sensor 1306, but the image sensor 1306 is obscured in FIG. 16B.

Figure 17:
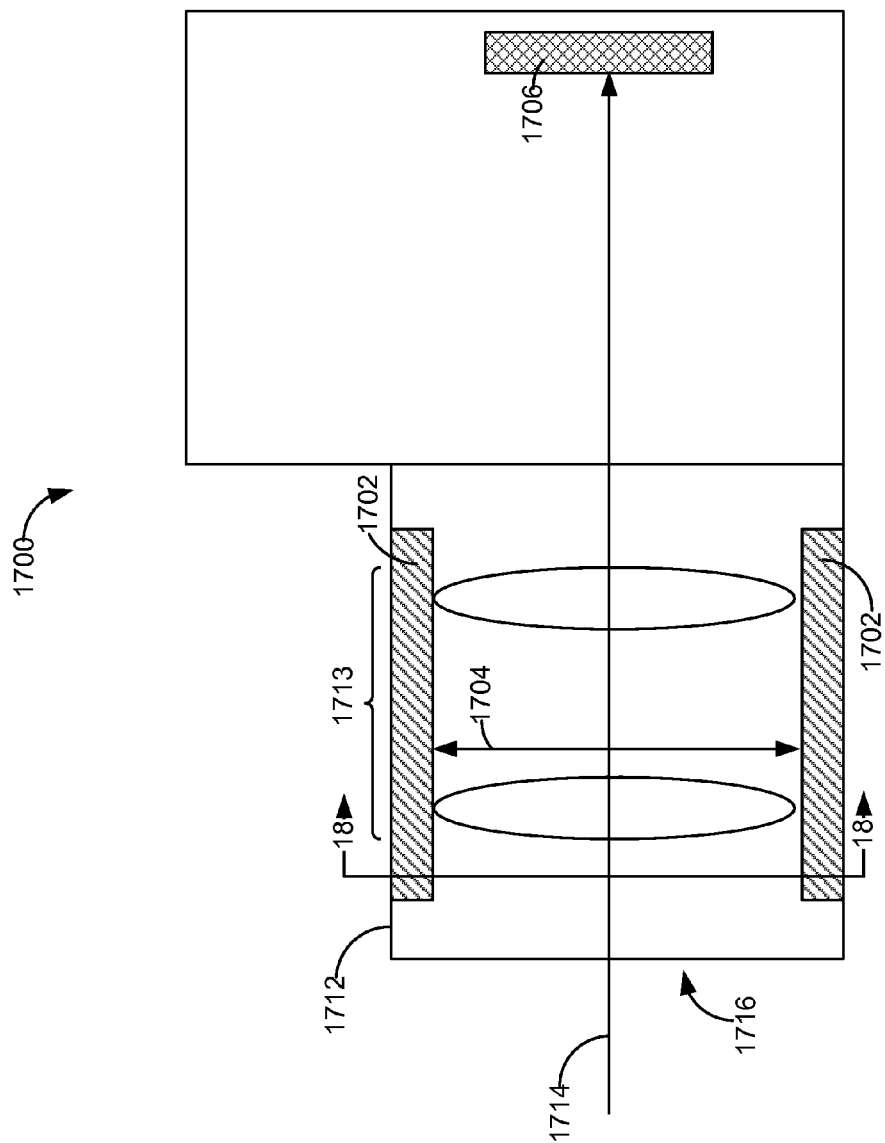
FIG. 17 is a cross section of an example imaging system that includes a battery with a structural gap.

FIG. 17 is a cross section of an example imaging system 1700 that includes a battery 1702 with a structural gap 1704. In one example, the imaging system 1700 may be a mirrorless interchangeable lens camera (MILC). The imaging system 1700 may further include an image sensor 1706, a lens apparatus 1712, one or more lenses 1713, and an aperture 1716. As shown, a light ray 1714 may pass through the aperture 1716, through the structural gap 1704, and on to the image sensor 1706.

Figure 18:
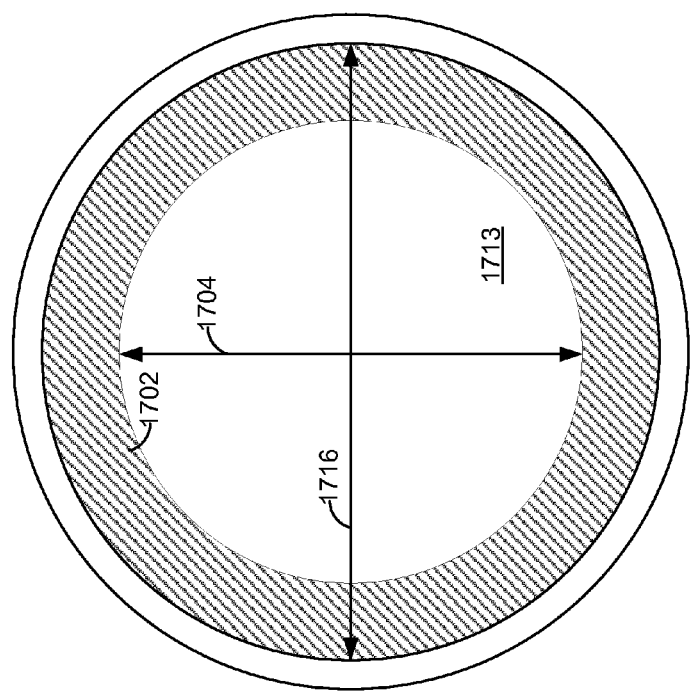
FIG. 18 is a cross section of an example battery with a structural gap.

The battery 1702 may have characteristics similar to those described above with regard to any of the batteries 102, 300, or 600. As shown, the one or more lenses 1713 are positioned and/or mounted within the structural gap 1704 of the battery 1702. The battery 1702 may have a hollow cylindrical shape, as shown in FIG. 18. Accordingly, the structural gap 1704 may have a circular shape, as shown in FIG. 18. In other examples the battery 1702 may have a toroidal shape, a torus shape, or a hexagonal shape, among other examples, to accommodate differently shaped lens apparatus.

FIG. 18 is another cross section of the imaging system 1700. As shown, the aperture 1716 may have a circular shape similar to the structural gap 1704. In some examples, the aperture 1716 may be adjustable so that a diameter of the aperture 1716 is smaller or larger than the structural gap 1704.

Figure 19:
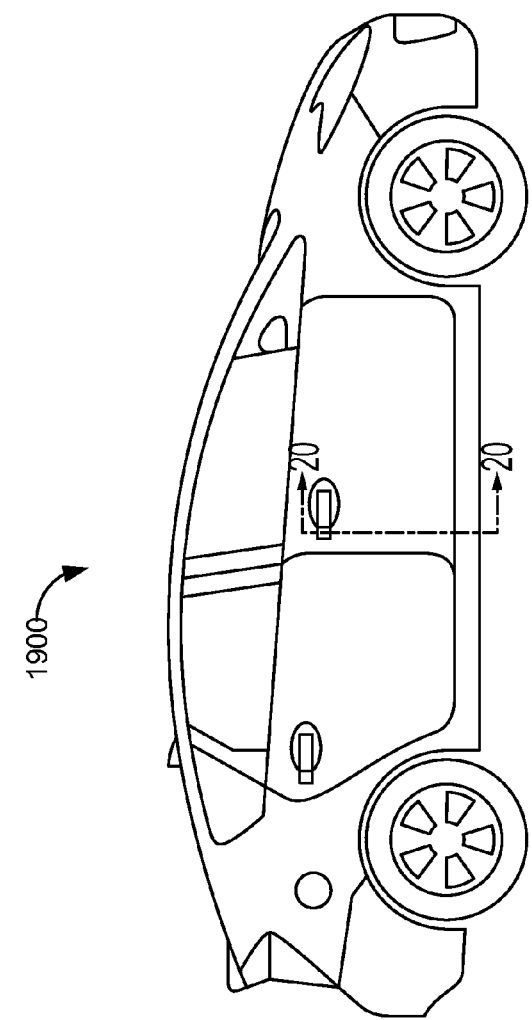
FIG. 19 shows an example vehicle.

FIG. 19 shows a vehicle 1900. While the vehicle 1900 is shown as a passenger automobile, the vehicle 1900 could also take the form of any kind of automobile, truck, semi-truck, boat, ship, or airplane. Other examples are possible.

Figure 20:
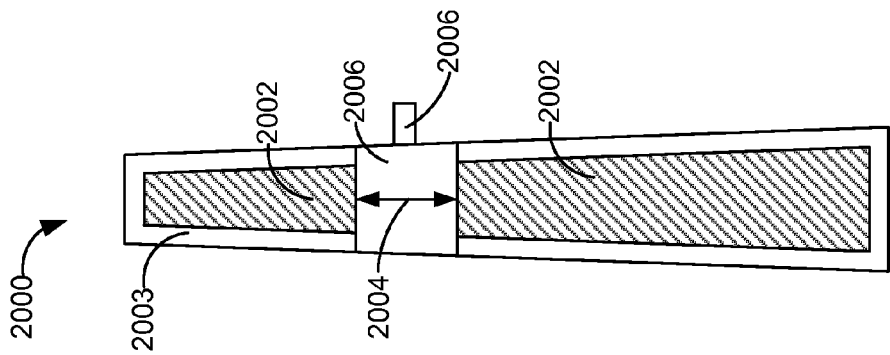
FIG. 20 shows an example battery, having a structural gap, formed within a door of a vehicle.

FIG. 20 is a cross section of a battery 2002 that includes a structural gap 2004 formed within a frame 2003 of a door 2000 of the vehicle 1900. The battery 2002 may include a lithium-ion battery. The battery 2002 may also have any characteristic described above as pertaining to the batteries 102, 300, or 600. The battery 2002 is positioned within the frame 2003 and is configured to provide electrical power to the vehicle 1900. The door 2000 also includes a handle assembly 2006 configured to open the door 2000. The handle assembly 2006 is positioned within the structural gap 2004.

Figure 21:
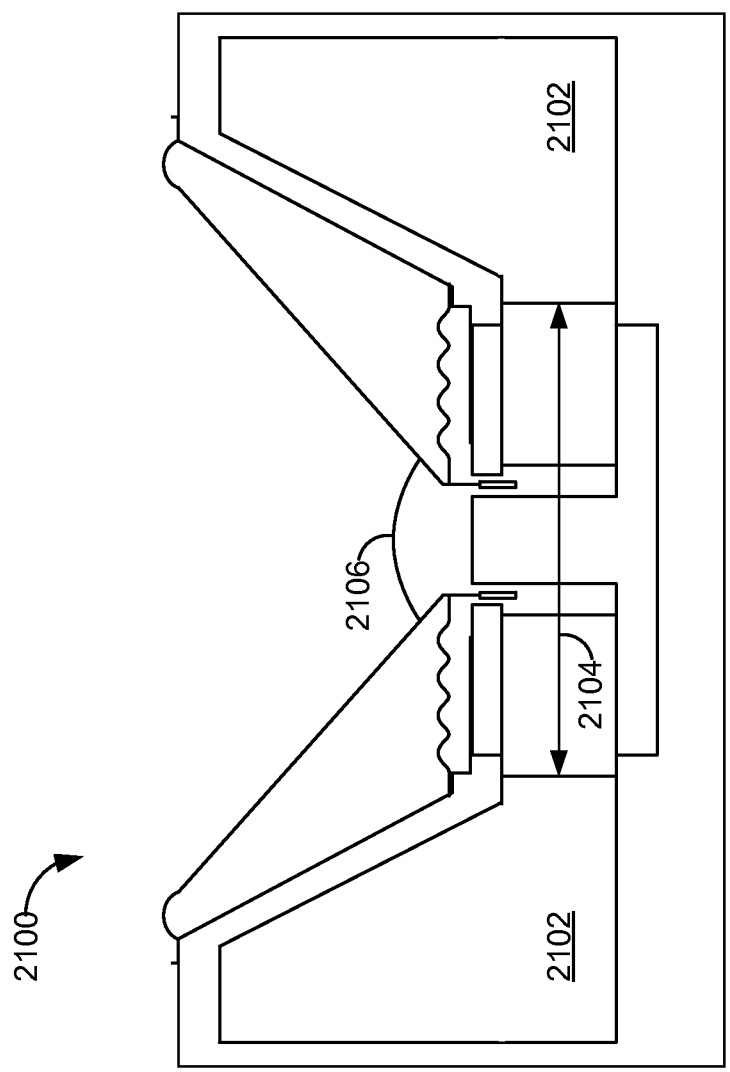
FIG. 21 shows an example loudspeaker that includes a battery with a structural gap.

FIG. 21 is a cross section of a loudspeaker 2100 that includes a battery 2102 with a structural gap 2104. The loudspeaker 2100 may include an audio driver 2106 positioned within the structural gap 2104. The battery 2102 may be configured to provide electrical power to the audio driver 2106 to generate sound waves. The battery 2102 may include a lithium-ion battery, and may be similar to the batteries 102, 300, and 600 in any respect described above. For example, the battery 2102 may include a cathode layer, an anode layer, and an electrolyte separator layer between the cathode layer and the anode layer, similar to battery 600 or 300. Accordingly, the structural gap 2104 may include a structural gap within the cathode layer, the anode layer, and the electrolyte separator layer.

Figure 22:
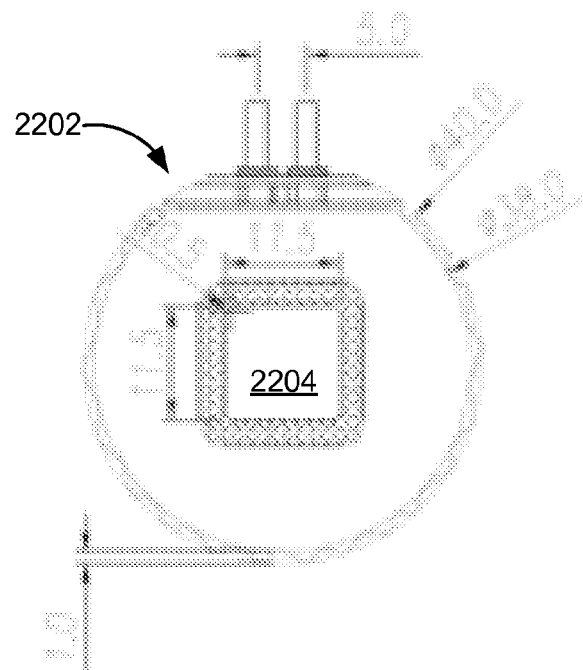
FIG. 22 shows an example battery.

FIG. 22 shows an example battery 2202 that includes a structural gap 2204. The battery 2202 may be formed similarly to other batteries described in this disclosure and may have a substantially circular shape configured to fit snugly within an enclosure of an electronic device (not shown) such as a smartwatch.

The structural gap 2204 may have a size and shape that allows one or more components of the electronic device to fit within the structural gap 2204. This may allow for more efficient use of the enclosed space within the electronic device. In this example, the structural gap 2204 has a square shape with rounded interior corners, but other examples are possible.

Figure 23:
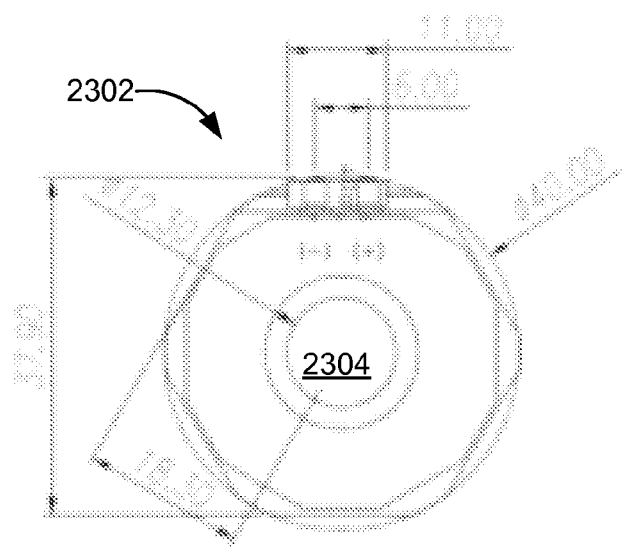
FIG. 23 shows an example battery.

FIG. 23 shows an example battery 2302 that includes a structural gap 2304. The battery 2302 may be formed similarly to other batteries described in this disclosure and may have a substantially hexagonal shape configured to fit snugly within an enclosure of an electronic device (not shown) such as a smartwatch.

The structural gap 2304 may have a size and shape that allows one or more components of the electronic device to fit within the structural gap 2304. This may allow for more efficient use of the enclosed space within the electronic device. In this example, the structural gap 2304 has a circular shape, but other examples are possible.

Figure 24:
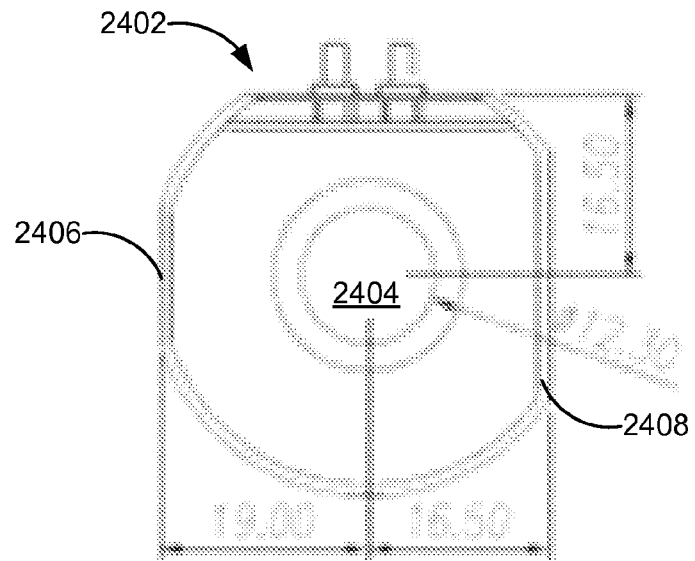
FIG. 24 shows an example battery.

FIG. 24 shows an example battery 2402 that includes a structural gap 2404. The battery 2402 may be formed similarly to other batteries described in this disclosure and may have a somewhat circular shape configured to fit snugly within an enclosure of an electronic device (not shown) such as a smartwatch. The battery 2402 may include "squared-off" edges 2406 and 2408 that further allow the battery 2402 to fit snugly within the enclosure of the electronic device.

The structural gap 2404 may have a size and shape that allows one or more components of the electronic device to fit within the structural gap 2404. This may allow for more efficient use of the enclosed space within the electronic device. In this example, the structural gap 2404 has a circular shape, but other examples are possible.

Figure 25:
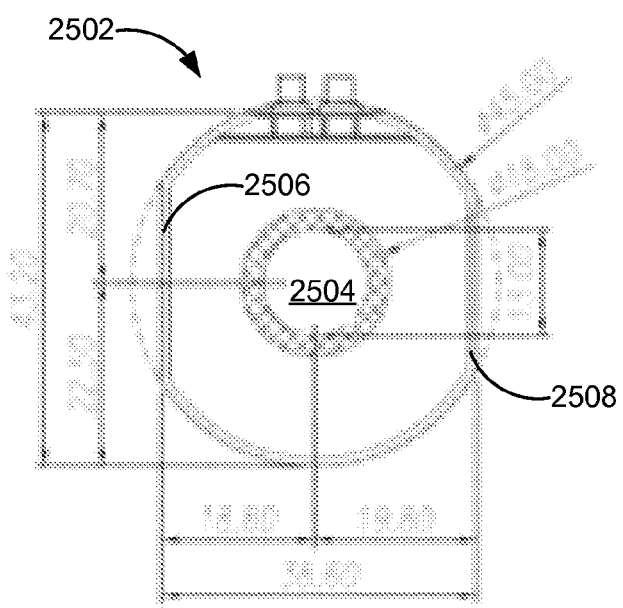
FIG. 25 shows an example battery.

FIG. 25 shows an example battery 2502 that includes a structural gap 2504. The battery 2502 may be formed similarly to other batteries described in this disclosure and may have a somewhat circular shape configured to fit snugly within an enclosure of an electronic device (not shown) such as a smartwatch. The battery 2502 may include "squared-off" edges 2506 and 2508 that further allow the battery 2502 to fit snugly within the enclosure of the electronic device.

The structural gap 2504 may have a size and shape that allows one or more components of the electronic device to fit within the structural gap 2504. This may allow for more efficient use of the enclosed space within the electronic device. In this example, the structural gap 2504 has a circular shape, but other examples are possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the Figures should not be viewed as limiting. It should be understood that other embodiments can include more or less of each element shown in a given figure. Further, some of the illustrated elements can be combined or omitted. Yet further, an example embodiment can include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An imaging system comprising:
   a battery comprising a structural gap, wherein the battery is configured to provide electrical power to the imaging system; and
   an image sensor configured to sense light that passes through the structural gap,
   wherein the image sensor is at least as large as the structural gap in at least one dimension.

2. The imaging system of claim 1, wherein the battery has a toroidal shape.

3. The imaging system of claim 1, wherein the battery has a torus shape.

4. The imaging system of claim 1, wherein the battery has a hexagonal shape.

5. The imaging system of claim 1, wherein the battery comprises a lithium-ion battery.

6. The imaging system of claim 1, wherein the battery is a first battery, wherein the imaging system further comprises a second battery configured to provide electrical power to the imaging system, and wherein the second battery has a larger energy capacity than the first battery.

7. The imaging system of claim 1, wherein the battery comprises:
   a cathode layer;
   an anode layer; and
   an electrolyte separator layer between the cathode layer and the anode layer,
   wherein the structural gap comprises a structural gap within the cathode layer, the anode layer, and the electrolyte separator layer.

8. The imaging system of claim 7, wherein the image sensor is mounted to the battery within the structural gap.

9. The imaging system of claim 1, wherein the structural gap is a first structural gap, the imaging system further comprising:
   a viewfinder apparatus; and
   a reflex mirror configured to be set in a first position or a second position,
   wherein in the first position the reflex mirror is configured to redirect light passing through the first structural gap toward the viewfinder apparatus, and
   wherein in the second position the reflex mirror is configured to allow light passing through the first structural gap to pass to the image sensor,
   wherein the battery further comprises a second structural gap that (i) faces the viewfinder apparatus and (ii) is configured to allow the reflex mirror to pass through the second structural gap to be set in the second position.

10. The imaging system of claim 9, wherein when the reflex mirror is set in the first position the light redirected by the reflex mirror passes through the second structural gap.

11. The imaging system of claim 9, wherein the battery comprises a trough structure, wherein the first structural gap is defined by a substantially u-shaped face at an end of the trough structure, wherein the second structural gap is defined by first and second walls of the trough structure that are oriented substantially perpendicular to the image sensor, and wherein the first structural gap is substantially perpendicular to the second structural gap.

12. The imaging system of claim 9, wherein the battery comprises a trough structure, wherein the first structural gap is defined by first and second walls of the trough structure that are oriented substantially parallel to the image sensor, wherein the second structural gap is defined by a substantially u-shaped face at an end of the trough structure, and wherein the first structural gap is substantially perpendicular to the second structural gap.

13. The imaging system of claim 1, further comprising a detachable lens apparatus comprising one or more lenses, wherein the one or more lenses are positioned within the structural gap of the battery.

14. The imaging system of claim 13, wherein the battery has a cylindrical shape.

15. The imaging system of claim 13, wherein the structural gap has a circular shape.

16. The imaging system of claim 1, wherein the battery surrounds the structural gap.

17. The imaging system of claim 1, further comprising an aperture, wherein at least a portion of the battery is positioned between the aperture and the image sensor.

18. The imaging system of claim 1, wherein the battery surrounds the image sensor.

19. The imaging system of claim 1, wherein the image sensor is mounted to the battery.

20. The imaging system of claim 1, wherein the battery comprises a singular structural portion that defines the structural gap.

* * * * *